(12) United States Patent
Harris

(10) Patent No.: US 7,134,016 B1
(45) Date of Patent: Nov. 7, 2006

(54) SOFTWARE SYSTEM WITH A BIOMETRIC DONGLE FUNCTION

(76) Inventor: Scott C. Harris, P.O. Box 927649, San Diego, CA (US) 92192

(*) Notice: Subject to any disclaimer, the term of this patent is extended or adjusted under 35 U.S.C. 154(b) by 1058 days.

(21) Appl. No.: 09/712,398

(22) Filed: Nov. 14, 2000

(51) Int. Cl.
*H04L 9/00* (2006.01)
*G06F 17/30* (2006.01)

(52) U.S. Cl. .................. 713/168; 713/193; 707/100; 380/45

(58) Field of Classification Search ............... 713/168, 713/186, 182, 201, 202; 380/23, 24, 45; 705/5, 41, 51, 52; 707/5
See application file for complete search history.

(56) References Cited

U.S. PATENT DOCUMENTS 6,484,260 B1* 11/2002 Scott et al. ................. 713/186
6,721,891 B1* 4/2004 Borza ........................ 713/202
2001/0018660 A1* 8/2001 Sehr ............................. 705/5
2001/0051928 A1* 12/2001 Brody ........................ 713/193
2002/0044655 A1* 4/2002 Applebaum ................. 380/45
2003/0005310 A1* 1/2003 Shinzaki ..................... 713/186
2003/0131235 A1* 7/2003 Wheeler et al. ............ 713/168

* cited by examiner

*Primary Examiner*—Jeffrey Gaffin
*Assistant Examiner*—Hassan Mahmoudi

(57) ABSTRACT

A program is installed by associating the program with an encrypted item of biometric information. The biometric information is encrypted using a private key on the server and associated with the program's execution file on the client. When the program is to be run, the encrypted biometric information is decrypted to obtain reference biometric information. That reference biometric information is compared with currently-obtained biometric information to detect a match. The program is allowed to run into specified and normal way only when the two indicia match. A limited to run may be allowed when the biometrics do not match.

6 Claims, 4 Drawing Sheets

SOFTWARE SYSTEM WITH A BIOMETRIC DONGLE FUNCTION

BACKGROUND

Software developers invest large sums of money in developing software, and regain that investment from their sales of software. Pirating of software enables someone who has not paid for the software to use it without paying. This can become a huge loss of revenue for the software companies.

The ability to pirate software is aided by technology. Many programs exist for copying CDs, even write protected CDs. Other programs and Internet sites are exclusively dedicated to finding ways to avoid any write protection or other pirate protection which is placed on a program. For example, certain Internet sites are dedicated exclusively to providing "crack" programs for time-limited versions of software. Other sites list authorized serial numbers for software.

Copy protection mechanisms have been used for protecting software against unauthorized use. Many of these copy protection mechanisms make the program harder to use by authorized users, and are hence disfavored by the public. These copy protection mechanisms often prevent even the authorized user from adequately using their program.

Many software manufacturers use at least some kind of security to attempt to ensure that the user of the program is in fact authorized. High ticket programs often use a "dongle", which may be a physical connector with special encryption codes stored therein. The program cannot be used without the dongle being physically attached to the computer.

Other systems require a long serial number to be entered. The program checks the serial number to determine if it meets a specified checksum condition. However, since CDs are often made from molds, the CDs which are produced are often precisely the same as each other CD that is produced. Therefore, any serial number that in fact correctly works on any program will work for all of the copies of the programs. Hence, as described above, the serial numbers may be improperly distributed over the Internet to thwart this security system.

Another technique has required the user to answer a question which could only be answered by someone who was in possession of the owners manual for the software. For example, the "Wolfenstein" program required an answer about what was listed on a specified page of the manual. This technique was so intrusive that actual owners of the software were often prevented from using the software.

U.S. Pat. No. 6,035,403 suggested personalizing a copy of software using a fingerprint reader at the point of sale. However, this required that the software media itself be personalized. This may not be easily done, especially with read only media such as CDs and DVDs.

SUMMARY

The present system teaches a technique of associating software with a user's personal details, and protecting software by using the user's personal details, e.g, by using a biometric function.

The software is installed in a way that associates the software with specified biometric characteristics of a user. Thereafter, the software's use is limited based on those same biometric characteristics. The software can be installed in other computers based on the same biometric characteristics. However, use is limited based on the biometric characteristics.

BRIEF DESCRIPTION OF THE DRAWINGS

These and other aspects will now be described in detail with reference to the accompanying drawings, were in.

DETAILED DESCRIPTION

The present invention realizes that software companies may base their revenue model on the number of authorized users, rather than on the number of installations. Many software programs expressly authorize the user to install the program in more than one computer so long as the user does not use those multiple installations at the same time. In enterprise versions of software, a single version may be installed in multiple workstations, and the administrator may be required to determine license fees for the software. The present invention specifies individualizing each licensed software to a specified authorized person. That authorized person may be allowed to use the software on one or on multiple machines.

Figure 1:
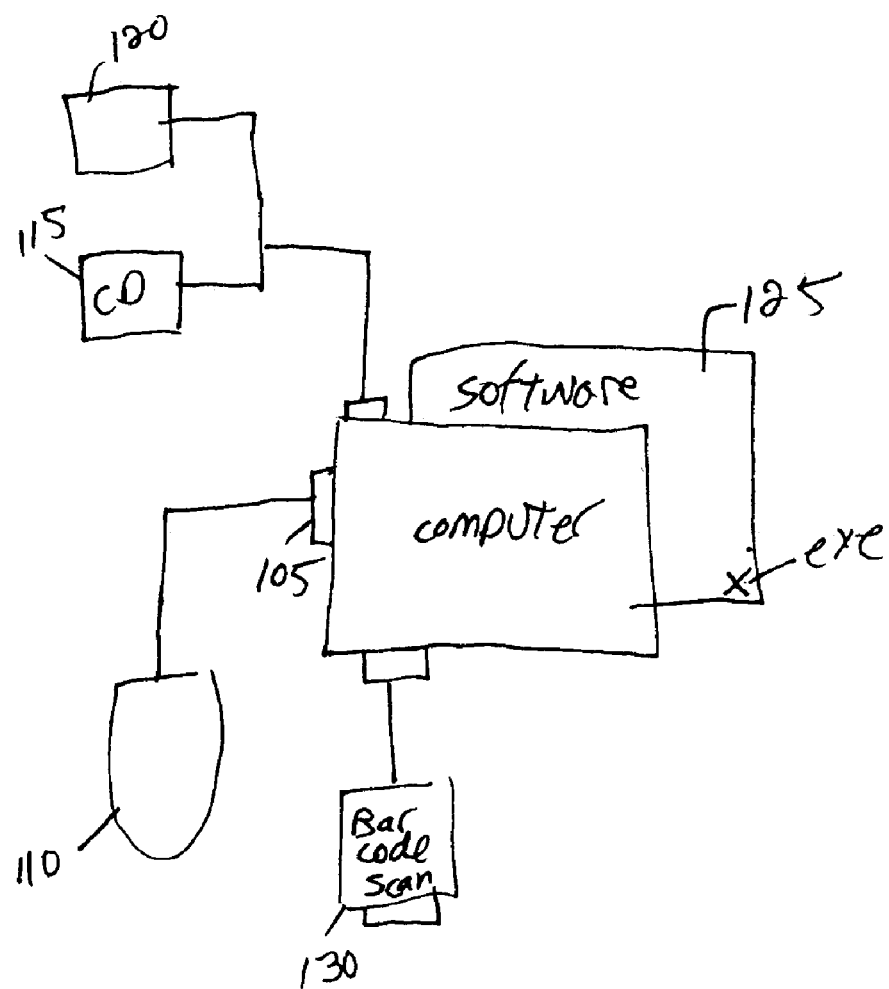
FIG. 1 shows a block diagram of the hardware of the present system.

The environment uses a hardware of the type generally shown in FIG. 1. A computer 100 includes a user interface and other conventional computer parts. The computer also includes a plurality of ports and interfaces. One of the ports 105 is connected to a biometric reader 110 which can read a biometric feature, which can be any biometric feature. A common biometric reader may be a fingerprint reader, and hence that example is described in this specification. The computer also includes a removable media reader including a first removable media reader 115 which may be a CD reader, and a second removable media 120 which may be a floppy disk or other read write media reader. The computer also runs an operating system shown as software layer 125.

In operation, the system begins by installing a specified program at 200. As part of the installation routine, the user is asked for verification of the fact that they are an authorized user. This may use conventional means or one of the new means described herein.

A conventional way of verifying that the user is an authorized user, requires the user to enter a series of digits at 205, e.g, a serial number or unlock code which is verified by the program. The verification can be based on specified criterion such as whether the series of digits meets a specified checksum.

Other alternative new ways of verifying whether the installer is in fact authorized are also described herein. A first way requires that the user have a bar-code scanning device 130 attached to an installing computer. The bar-code scanning device may be connected to any desired port such as a USB port. Bar-code scanning device 130 is used to scan a specified bar-code from or associated with the packaging of the program. For example, the bar-code may be printed on the CD itself. In this way, the original CD which is distributed with the program may be capable of scanning by a bar-code scanner. However, any copies of that CD will not have the bar code printed thereon, and hence not be similarly capable of being scanned. Therefore, installation can only be carried out when the original CD is present for scanning the bar code at 210. Backups of the CD can be made, and those backups can be used for program installation as long as the original CD is present. If the original CD is damaged, the backup can be used, but only if the original CD is available for bar-code scanning.

Another technique displays a specified pattern such as shown in 215 on or associated with the packaging of the program. The pattern includes a series of lines, each line having a number of associated with a vertex of the line. The pattern may be written for example on the box that accompanies the CD, or on the packaging of the CD itself. A user puts the mouse over the lines and traces the lines. By following the positions on the pattern, information is entered which is matched to information stored within the program.

Only a user who has this information can trace the pattern.

Another optional technique, shown in 220, may be used by itself, or in combination with other techniques. This technique personalizes the software.

Many read only media cannot easily be made unique. For example, it is difficult to make uniquely identifiable CDs. Accordingly, this system uses all installation media, e.g., CDs, being the same, but packages the program with a separate unit which is individualized. Each individualized unit becomes the identity for that specified software. The individualized unit can be a floppy disk, a memory stick™ or any other type of readable and/or writable memory, or simply a single use code. The identity may allow a single install only and may prevent further installations after the first installation. If the code is on a read/write media, the code can be removed from the memory during the install, so that it cannot be used for another install. If the code is simply a number, the number is registered during installation, and cannot be used for a later installation.

As described herein, this system however does not prevent other authorized installations as was the case with early copy protection software.

Many of these systems may prevent or eliminate the usual technique of distributing codes over the Internet. For example, the bar-code scanning technique of 210 would require that the actual bar-code be distributed over the Internet. This may be relatively more difficult than distributing the code numbers. The vertex system of 215 may also require distributing an actual image or instructions for following the pattern. This again is more difficult than distributing a numeric code.

Figure 3:
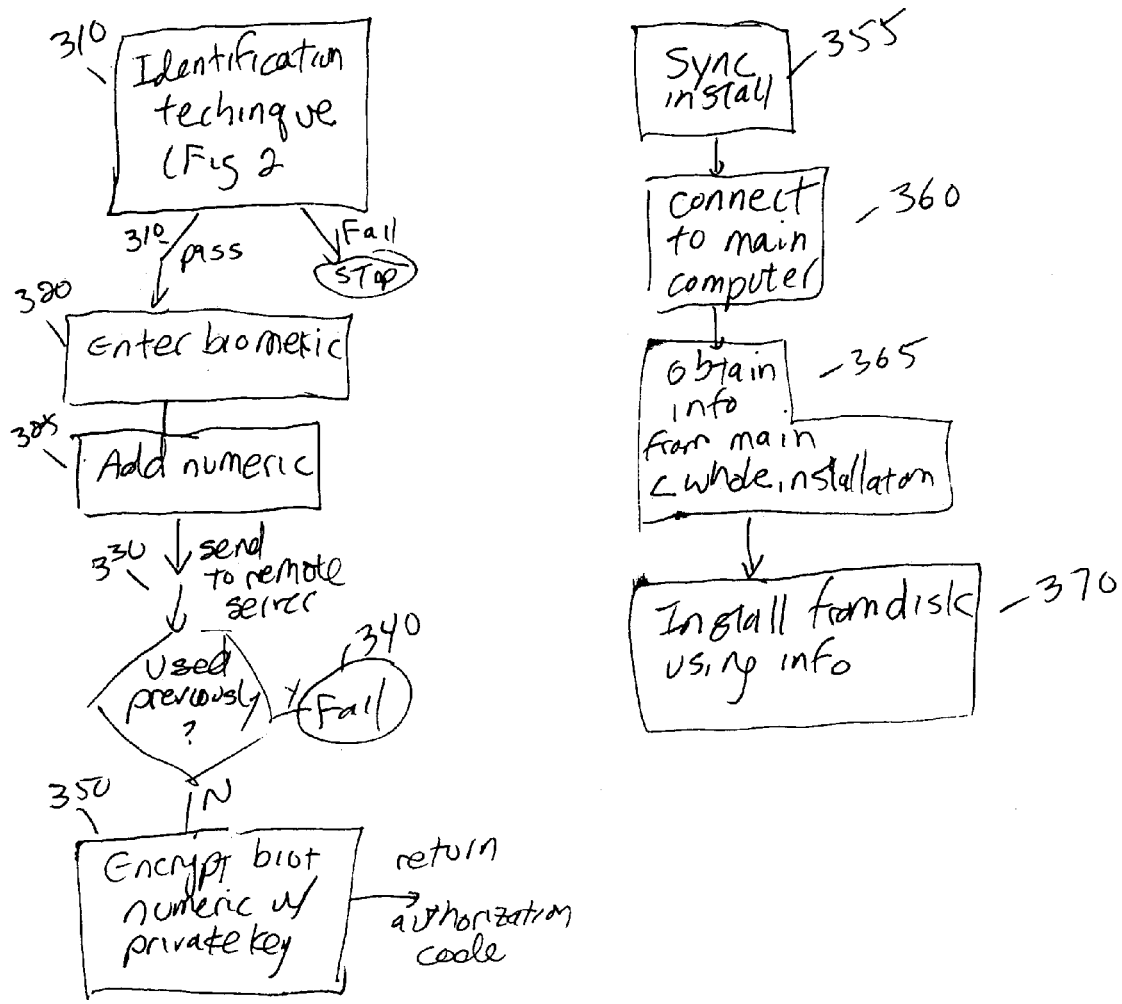
FIG. 3 shows a flowchart of installing software according to the present system.

The installation generally follows the techniques in the flowchart of FIG. 3. There are two basic ways to install the product in this system. One is a new install, which must follow the left-hand side part of the flowchart in FIG. 3 described herein. However, once the product is installed in one computer, a sync install is allowed.

Figure 2:
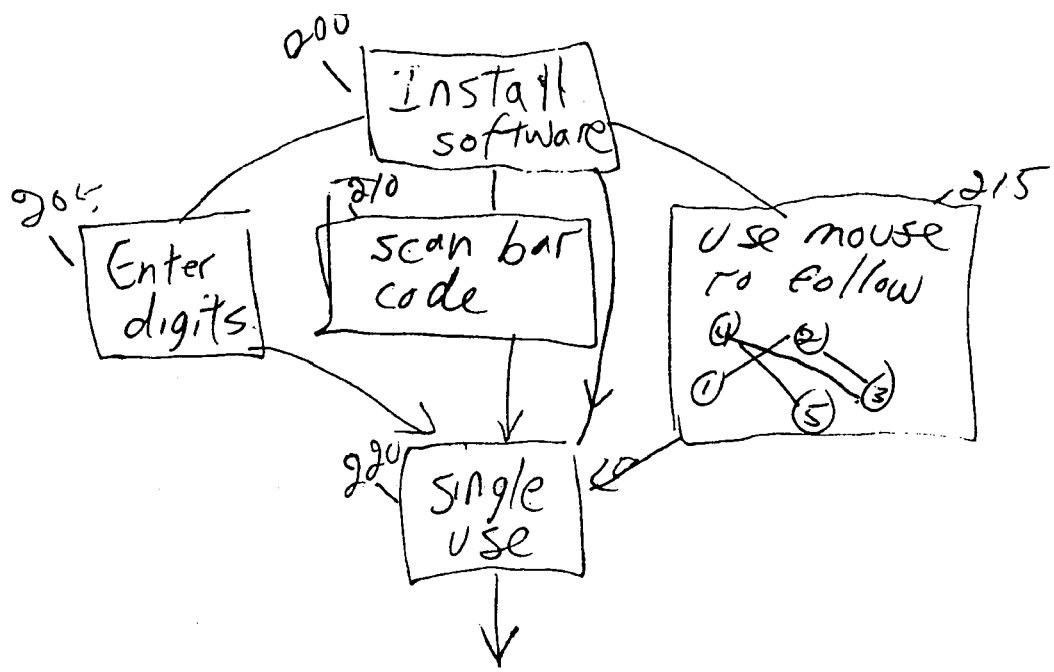
FIG. 2 shows a flowchart of verifying software according to the present system.

The new install begins at 300, where a specified identification technique is followed, e.g., one of the ones shown in FIG. 2, or any other. 310 generally determines if the system has passed or failed this technique. If there is a failure, then the system refuses to install the product much like in conventional products of this type. If the system passes at 310, then the user is prompted to enter biometric information at 320. The biometric information can be input through any reader attached to any port. This biometric information becomes the reference biometric information which will be used to determine execution of the program. The biometric information may be combined with a numeric indicia, which may be a random number, may be based on the CD code entered at 300, or the other unique code obtained at 300. This information is sent to a remote server at 330.

The example given herein assumes that the codes are unique codes. For example, each CD code which is entered at 300 is individualized to the CD and cannot be used for subsequent installation other than the single CD. Therefore, even though all the CDs may be identical, each of the codes effectively makes the CD unique. Similarly, the unique code obtained from the disk is unique to the single installation. Each code may represent a single license, for example. The server determines if the code has been used previously. If so, then an installation has already been carried out for that license, and at 340, the server refuses to return an authorization code. However, if the code has not been used previously, and is authorized, then the server returns an authorization code. The authorization code may be produced by the server using a one-way function. One example is the use of public key cryptography. The server may use its private key to encrypt a code that includes the reference biometric and the unique code at 350. The software, in operation, includes the public key corresponding to the private key that is used at 350. Hence, the software can decrypt the code and obtain the biometric information. However, neither the software, nor any other hacker who is not in possession of the private key, can produce an authorized code which includes the biometric code. Cryptographic programs which can encrypt using this kind of encryption and can also verify whether the code is has been produced by an authorized key, are well-known.

A hacker who obtains a code from someone else will be able to use that code as an authorized code. However, as described herein, the software will not operate properly unless biometric information is entered that meets the biometric information included as part of the code.

The encrypted authorization code is included as part of an authentication layer for the software. The software uses its public key to decrypt the code each time or at, specified times when the software is started. The information in the encrypted sequence is used to verify the biometrics.

The sync install at 355 allows connection to the main computer, i.e. the one that first installed the program at 360. The connection can be via a remote connection techniques such as Ethernet, LapLink, PC anywhere, direct cable connection, phone line, or any other technique of this type. Specified information is obtained from the main computer at 365. This specified information is less than the entire installation. Only a relatively small amount of information needs to be transmitted over the remote connection. The specified information may include the encrypted authorization code with the biometric information. The computer may also return preference information such as recently worked-on documents, and information about any way that the installation has been customized.

At 370, the sub computer is allowed to install a new installation based on the information received from the main computer and based on the install disk(s). That installation will use the encrypted sequence which is obtained from the main computer. The installation may also include the specified preferences from the main computer.

Note that even though a new installation is carried out in this step, this new installation will still only be allowed for use by the owner of the biometric information.

The above has described a single biometric key being an authorized key. However, it may be possible to provide multiple authorized biometric codes. Different versions of the program may be produced which are, for example, for family use. These versions of the program may allow multiple biometric items of information to be used so that the entire family can use the program.

Figure 4:
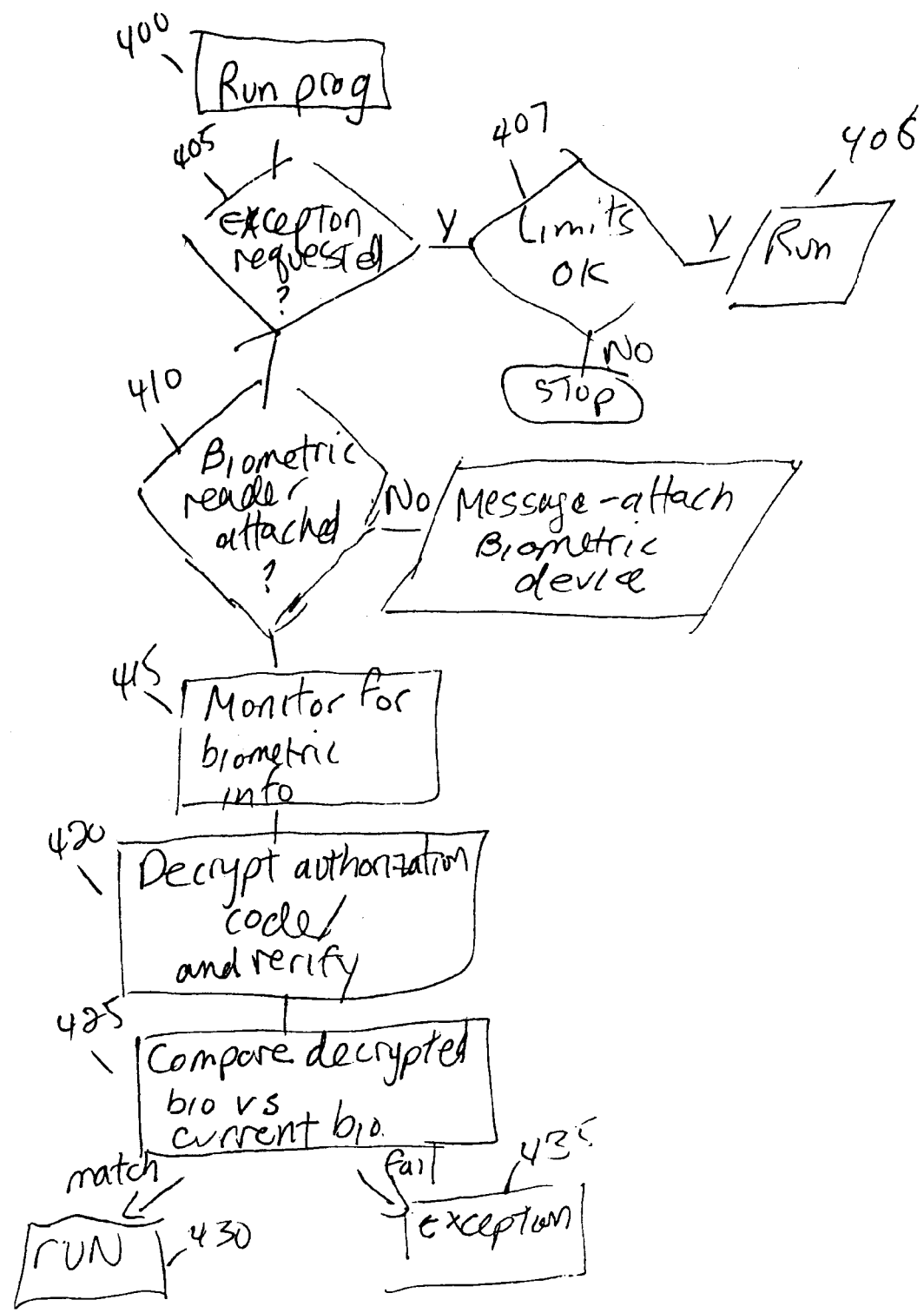
FIG. 4 shows a flowchart of using software according to the present system.

The operation of running the program is described herein with reference to FIG. 4. The user requests the program to be run at 400. There are two different ways to run the program. A normal or unrestricted run requires that the biometric information be entered, and that the entered biometric information match to the reference biometric information that is part of the encrypted sequence. A limited run, or exception, can allow the program to run in the specified way. The specified way can be a limited run, limited amount of time of running, or limited in some other way.

The system first detects whether an exception is requested at 405. The exception may be allowed in specified circumstances, when the limits are detected to be ok at 407. For example, someone other than the registered user may be able to start the program under limited circumstances. One of these limited circumstances may be a limited-time run. For example, the program may be allowed to be started for a half-hour run. Another limit on circumstances may be the number of times that a non authorized run can be requested in a certain time, or in a row. One example which may be preferred is that no more than three in a row unauthorized starts may be allowed, and no more than two in any one 24-hour period. If the limits are detected to be OK at 407, then a run is allowed at 408.

If no exception is requested at 405, the system next detects if a biometric reader is connected to a specified port at 410. If not, the program exits, and produces a message telling the user to connect a biometric reader to the port. If a reader is connected to the port at 410, the system monitors for data at 415. Data from the port is sent to the program.

At 420, the program begins running with an initial operation of decrypting the encrypted authorization code using the public key which is contained within the program. As part of the decryption, signatures are tested to make sure that the stream is an authorized stream from the authorized provider. The output data includes specified information including the biometric information.

The biometric information from the decryption is compared against the currently-obtained information from the biometric reader connected to the port, at 425. This may use any conventional technique of comparing biometric information. For example, if the biometric information is fingerprint information, minutiae extraction may be used to monitor whether the fingerprint is authorized. If there is a match at 425, the program is allowed to run at 430. If not, the user may be allowed to run in exception mode at 435, or the user may be prompted to re-enter the biometric information.

Different modifications are possible. In one modification, the user may be prompted to enter personal information when the biometric reader fails. This personal information can be a temporary way of starting the program, for example for use in difficult situations only.

Moreover, other kinds of biometric information including face recognition, hand scanning, breath recognition, and retinal scanning, as well as others, may be used as the identifying information.

Another modification can include time and date information as part of both or either of the decrypted authorization information, and the read biometric information. The system compares the time and date stamp with the internal clock, and allows the program to run only if the time is recent, e.g., within a few minutes. In this way, the system ensures that the information is newly-read each time the program is started, preventing the program from being started using old data, e.g., cached data.

This system can also be used with a hardware dongle, which can be a conventional dongle that connects to a port, or the special dongle described herein. Computers, e.g., PCs, PDAs and cell phones may include credit card readers. These credit card readers may be readers that read magnetic information, or may read electronic information from the credit card such as from a smart chip on the credit card or as described in our co-pending application Ser. No. 09/690,074. According to this system, the encryption codes for the "dongle" may be written onto a credit card shaped device, and read from the card reader that is also adapted for reading credit card information. The encryption codes can be session codes only by including the current time and date as part of the code. Each run of the program requires the encryption codes to be read from the card reader. Possession of the card therefore becomes necessary to run the program.

The system operates in a similar way to that described above with respect to FIG. 4. The system detects if the credit card reader or other information reader is connected to the port, reads data from the port, decrypts certain data to detect if the data is authorized, and if so allows the program to run.

Although only a few embodiments have been disclosed in detail above, other modifications are possible. In one modification, this same technique may be used to control access to a computer. In this modification, the authorized user of the computer goes through a similar startup procedure, obtaining an encrypted sequence which is stored in the BIOS. Subsequent initiations of the computer can only be carried out when a biometric reader is connected to a port and biometric information that is entered matches the information in the encrypted sequence.

Ownership of the computer can be changed by contacting the manufacturer and obtaining new information, or by re flashing the bios.

This system can also be used in a network environment. In the network environment, a copy of the software may be placed on the network server. Any user can install the software in any workstation on the network. However, only authorized users will be able to execute the program in anything other then an exception mode. This system may use multiple biometrics which are returned with the authorization code. Additional users can be added, by indicating to the program server that additional users are desired, paying the appropriate license fee, adding in their biometrics to the list of authorized biometrics. An update system can be used to maintain an updated list of authorized biometrics.

In this network environment, any authorized user will be able to execute the program on any computer on the network. In an alternate embodiment, only the owner of the computer will be able to execute the specific copy of the software on the users specific computer. In addition, biometrics of system administrators and the like may be added so that the system administrator can operate the software on any computer.

What is claimed is:

1. A method, comprising:
   storing encrypted information associated with a computer program;
   obtaining personal information as part of a startup sequence for said computer program; and
   reading said encrypted information, decrypting information contained therein to obtain decrypted information, and comparing said personal information with said decrypted information;
   allowing said computer program to run normally only if said personal information agrees with said decrypted information in a specified way; and further comprising allowing the software to run in a limited exception mode without establishing that said personal information agrees with said decrypted information.

2. A method, comprising:
requesting a computer system to install a specified computer program;
determining whether said computer program is verified for installation;
obtaining a reference biometric information from an authorized user at the time of installing the software, responsive to said determining that said computer program is verified for installation; and
thereafter allowing said program to run normally only when biometric information is obtained which matches said reference biometric information;
after determining that said installation is authorized, sending said reference biometric information to a server, at the server, encrypting said reference biometric information, and returning encrypted biometric reference information which is stored with said program, and which is used by said allowing, wherein said reference biometric information is encrypted at said server using a private key of a public key-private key pair, and said reference biometric information is decrypted when software is to be run, using said public key corresponding to said private key.

3. A method, comprising:
storing encrypted information associated with a computer program;
obtaining personal information as part of a startup sequence for said computer program; and
reading said encrypted information, decrypting information contained therein to obtain decrypted information, and comparing said personal information with said decrypted information;
allowing said computer program to run normally only if said personal information agrees with said decrypted information in a specified way;
wherein said personal information is biometric information, and said comparing comprises comparing said biometric information with other biometric information in said encrypted information, and
further comprising installing said computer program by entering a biometric code, sending said biometric code to a server, encrypting said biometric code at said server and returning an encrypted sequence to said computer program as said encrypted information.

4. A method as in claim 3, wherein said encrypting uses a private key at said server, and said decrypting verifies a signature of said private key.

5. A method as in claim 3, wherein said encrypting uses a private key at said server, and said decrypting uses a public key included as a part of said computer program.

6. A method as in claim 3, further comprising determining if a biometric reader is attached to a port, and wherein said program is only allowed to run if said biometric reader is attached to said port.

* * * * *